United States Patent Office 2,907,789
Patented Oct. 6, 1959

2,907,789

PROCESS FOR THE PRODUCTION OF WATER-SOLUBLE ANTI-THROMBOTIC ORGANIC SALT PREPARATIONS

Hans Kreis, Berlin, Germany, assignor to Helopharm W. Petrik & Co. KG., Berlin, Germany No Drawing. Application December 7, 1956
Serial No. 626,816

2 Claims. (Cl. 260—429.2)

The invention relates to a method for the preparation of rare earth salts which have an antithrombotic action, in particular to neodymium, praseodymium, lanthanum, cerium, and didymium, with levulinic acid.

The antithrombotic action of the above-mentioned earths has already been known for a long time (Ajazzi-Manzini, Arch. di Fisiol., Firenze 25 (1927)). Their inclusion in pharmacy has however been delayed until now because they form salts which are not readily soluble in water, so that for injections only highly diluted solutions could be used. This hindered, if not totally excluded their application out of consideration to the patient's added complaints.

After it was ascertained that the inhibitory action of the rare earth ions on the coagulation of blood was particularly effective, a solution of neodymium acetate was used to combat thrombosis. (H. Dykerhoff and N. Goossens, Z. Ges. Exp. Medizin., B 106, 1939). This had indeed an antithrombotic action, but had also other unpleasant side reactions attendant upon it. Apart from that, the solubility of this salt (2.4%), was not quite sufficient.

A further known remedy resulted from the combination of neodymium with nicotinic acid. Although injections of this agent proved to be more tolerable, the solubility in water (0.3%), was still insufficient to maintain stable and therefore crystal-free solutions of the injections. A change was made therefore to isonicotinic acid, but since here again the solubility was not satisfactory, a further change was made to isonicotinic sulphonic acid (Vincke, E. Sukker, Klin. Wschr., 1950, page 74). This very potent antithrombotic compound requires, however, for its productions, which in practice sets out from γ-picolin, a very troublesome method involving extensive apparatus and hence is very costly. Furthermore, highly purified neodymium salts are required, as there is otherwise a danger of precipitation of small crystals of lanthanum, which are generally allied and hence difficult to separate. (Neodymium isonicotinic sulphonic acid solubility 2.25%).

In contrast to the above, the method according to this invention consists in combining soluble salts of the rare earths, e.g. didymium carbonate or didymium hydroxide, with levulinic acid (β-acetylpropionic acid), and then isolating the resulting acetyl propionate of neodymium and drying it, or using it immediately without prior isolation for the solution to be injected. The formula of the salt is $Di(CH_3.CO.CH_2.CH_2.CO_2)_3 + 6H_2O$.

*Example*

45 g. dehydrated didymium carbonate are introduced into a wide-neck Erlenmeyer flask with approximately 1 l. distilled water. The mixture is heated on a water bath, treated with 70 g. levulinic acid in added portions, and further heated to boiling for about 2 hours on the wire gauze. At the end the pH of the solution should be 6.0. If required, this pH value can be adjusted accordingly by further adding more carbonic acid or didymium carbonate. After filtration of the solution, the didymium levulinic acid can be obtained by evaporation of the water and drying. Yield: approximately 98.5% of the theoretical value. The salt is pale brown and transparent. It can be purified from traces of impurities by boiling twice with charcoal, and it then appears pale violet. The solubility in water of the new salt is markedly higher than that of the hitherto neodymium salts used for antithrombotic purposes (solubility in water 30%), and furthermore, it has the property of being well tolerated when used in conjunction with other therapeutic agents, e.g. derivatives of theophylline, atropine and salts of nicotinic acid.

Through the easy production of the new salt, and of the possibility of using didymium instead of the highly purified neodymium, the production costs are markedly lowered and permit a real extension of its clinical application.

I claim:

1. A method of manufacturing an anti-coagulant comprising the steps of adding levulinic acid to an aqueous solution of a rare earth salt selected from the group consisting of didymium carbonate, didymium hydroxide, neodymium carbonate, neodymium hydroxide, praseodymium carbonate, praseodymium hydroxide, heating the solution, regulating the pH of the heated solution to a pH of substantially 6.0 by the addition of acid, filtering said solution, and then evaporating the water in said solution to obtain the rare earth salt of levulinic acid.

2. A method of manufacturing an anti-coagulant comprising the steps of adding levulinic acid to an aqueous solution of didymium carbonate, boiling the solution for approximately two hours, regulating the pH of the boiled solution to substantially 6.0 by adding a compound selected from the group consisting of carbonic acid and didymium carbonate to a pH of substantially 6.0, filtering the solution and then evaporating the solution to obtain the crystals of didymium levulinic acid.

References Cited in the file of this patent

FOREIGN PATENTS 633,370    Great Britain _____ Dec. 12, 1949
    (Abstracted in C.A. 45, 1736a)

OTHER REFERENCES

Proskowiakoff, "J.A.C.S." 55, 2132–34 (1933).
Beaser: "J. Clin. Investigation" 21, 447–54 (1942). (Abstracted in Chem. Abs. 36, 7131) (Copy at Nat'l Inst. of Health, Bethesda, Md.).